2,909,527
N,N'-SUBSTITUTED-BIS-(3-OXYPYRIDYL) BETAINES AND THEIR PREPARATION

Seymour L. Shapiro, Hastings on Hudson, and Louis Freedman, Mount Vernon, N.Y., and Kurt Weinberg, Hackensack, N.J., assignors to U.S. Vitamin & Pharmaceutical Corporation, a corporation of Delaware No Drawing. Application September 6, 1956
Serial No. 608,195

7 Claims. (Cl. 260—296)

This invention relates to a composition of matter and to a method for the preparation thereof. More especially, it pertains to N,N'-substituted-bis-(3-oxypyridyl) betaines, and includes correlated improvements and discoveries whereby pyridine derivatives of enhanced properties are provided.

The novel compounds are represented by the following general formula:

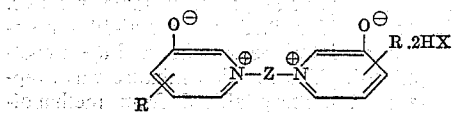

where Z is selected from the group consisting of an alkylene group containing 1–10 carbon atoms, and said group may be linear, branched, saturated or unsaturated, an alkylene-arylene-alkylene group of from 8–16 carbon atoms, an alkylene-keto-alkylene group, and an alkylene-w-alkylene group of from 2–10 carbon atoms wherein w is selected from the group consisting of oxygen, sulfur, substituted nitrogen and keto-alkylene. The chain of atoms connecting the nitrogen atoms of the two 3-oxypyridine rings may also contain substituents which do not interfere with the desired reaction, and unsaturated linkages between carbon atoms within the chain. R is selected from the group consisting of hydrogen and methyl. The acid salt of the betaine is derivable from the initial reactant, and X is a non-toxic anion selected from the group consisting of halogen, benzsulfonate, and p-toluenesulfonate, and the like. These acid salts represent the most convenient form in which to isolate the products of this invention.

It is an object of this invention to provide a method for the synthesis of N,N'-substituted-bis-(3-oxypyridyl) betaines which may be carried out effectively, readily, and economically.

A principal object of the invention is the provision of N,N'-substituted-bis-(3-oxypyridyl) betaines by reacting a 3-hydroxypyridine with, for example, 1,4-dichlorobutane in a suitable solvent such as n-propanol.

Other objects of the invention will in part be obvious and will in part appear hereinafter.

The invention accordingly comprises the several steps and the relation of one or more of such steps with respect to each of the others, and the composition possessing the features, properties, and the relation of constituents which are exemplified in the following detailed disclosure, and the scope of the invention will be indicated in the claims.

In the practice of the invention the betaines are prepared by reacting, preferably in a solvent, two moles of a 3-hydroxypyridine with a molar equivalent quantity of a compound which may be represented by X—Z—X' wherein Z has the same significance as above, and X and X' may be the same or different, and represent chlorine, bromine, iodine, benzsulfonate and p-toluenesulfonate, and the like. It is preferable from the standpoint of convenience of isolation of pure products in good yield that X and X' be the same, and in the examples and table that follow for illustrative purposes, the reactant groups are those derived from dihalides which are conveniently and economically obtainable commercially. It is to be understood that the structures bearing the reactant groups employed should not contain interfering functional groups which would prevent the desired reaction from taking place. The solvent employed may be varied with use being made of a lower alcohol, e.g., ethanol, propanol, isopropanol, butanol; other polar solvents such as acetonitrile; nonpolar solvents such as toluene and xylene, and other inert solvents which will not react with the reagents. Suitably we use the propanols or acetonitrile in that reaction and product isolation conditions are simple with the reaction proceeding rapidly at reflux temperatures of these solvents. The temperature conditions may range from room temperature, i.e., about 20° C., to about 150° C., with that being employed varying with the solvent. In many instances, immediate exothermic reactions are observed.

The compounds of this invention and the methods of their preparation are illustrated by the following equation:

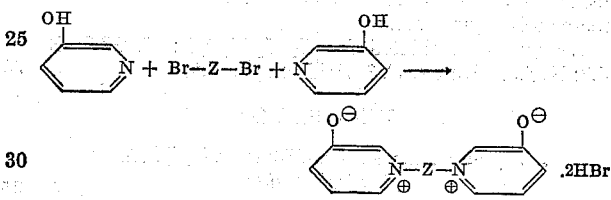

and consistent therewith, the compounds show the following chemical properties: yield orange-brown color with ferric chloride solution; are precipitated as the free betaines by addition of alkali which can be reverted to the original acid salt by treatment with acid; the free betaine is water-soluble and its water solution is neutral and gives a brown-orange color with $FeCl_3$; aqueous solutions of the betaine acid salts on treatment with sodium bicarbonate solutions liberate carbon dioxide; on treatment with phenylisocyanate or acetic anhydride the products are recovered unchanged; on treatment of the free betaines with alkyl halides the alkoxy quaternary compounds are formed, and these simple derivatives are to be considered within the purview of this invention.

The following equation illustrates the latter reaction:

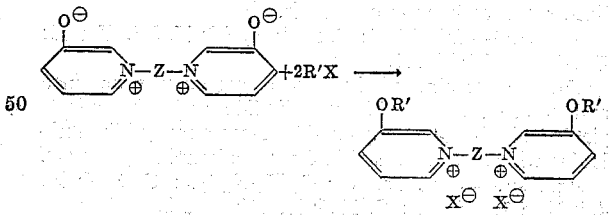

wherein Z and X have the same meaning as hereinabove given, and R' is a lower alkyl group, e.g., methyl, ethyl, propyl and butyl, and benzyl.

As an illustrative embodiment of a manner in which the invention may be practiced the following examples are presented.

EXAMPLE 1

N,N'-tetramethylene-bis-(3-oxypyridyl) betaine dihydrochloride

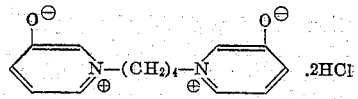

A solution of 9.5 g. of 3-hydroxypyridine and 6.35 g. of 1,4-dichlorobutane in 50 cc. of n-propanol was refluxed for 20 hours. Crystals separated during the reaction, and on cooling the reaction mixture an additional crop of crystals separated. The product was filtered and recrystallized from methanol-ethylacetate.

*Analysis.*—Calculated: N, 8.8. Found: N, 8.8.

A dipicrate was made from an aqueous solution of the above product and aqueous picric acid, and recrystallization from water.

*Analysis.*—Calculated for $C_{26}H_{22}O_{16}N_8$: C, 44.4; H, 3.1; N, 16.0. Found: C, 44.1; H, 3.4; N, 15.7.

The free base of the above product was prepared by adding the calculated quantity of sodium methoxide to a methanol solution of the dihydrochloride. The formed sodium chloride was filtered off; the filtrate evaporated, and the residue recrystallized from ethanol-heptane. The free betaine so produced, is quite hygroscopic.

*Analysis.*—Calculated for $C_{14}H_{16}N_2O_2$: N, 11.5. Found: N, 10.9.

The free base obtained as above was treated with an excess of methyliodide in ethanol. After standing 48 hours and refluxing 2 hours, the quaternary salt, N,N'-tetramethylene-bis-(3-methoxypyridinium) iodide precipitated and was recrystallized from ethanol-ethylacetate.

*Analysis.*—Calculated for $C_{16}H_{22}N_2O_2I_2$: C, 36.4; H, 4.2. Found: C, 36.5; H, 4.3.

The corresponding N,N'-tetramethylene-bis-(3-ethoxypyridinium) iodide was similarly prepared in propanol using an excess of ethyliodide, and recrystallized from methanol-ethylacetate.

*Analysis.*—Calculated for $C_{18}H_{26}N_2O_2I_2$: C, 38.9; H, 4.7; N, 5.0. Found: C, 38.7; H, 4.8; N, 4.8.

EXAMPLE 2

*N,N'-pentamethylene-bis-(3-oxypyridyl)betaine dihydrobromide*

A solution of 9.5 g. of 3-hydroxypyridine and 11.49 g. of 1,5-dibromopentane in 50 cc. of isopropanol was refluxed 20 hours and cooled. Filtration yielded the desired product which was recrystallized from aqueous ethanol-acetone.

*Analysis.*—Calculated: C, 42.9; H, 4.8; N, 6.6. Found: C, 42.8; H, 5.0; N, 6.9.

The dihydrochloride was prepared in a similar manner substituting an equivalent quantity of 1,5-dichloropentane and using methylcellosolve as the solvent, and recrystallized from methanol-ethylacetate.

*Analysis.*—Calculated: C, 54.4; H, 6.0; N, 8.5. Found: C, 54.1; H, 6.2; N, 8.1.

The free betaine of the above product was obtained and upon treatment with methyliodide, as in Example 1, yielded N,N'-pentamethylene-bis-(3-methoxypyridinium)-iodide which was recrystallized from ethanol-ethylacetate.

*Analysis.*—Calculated for $C_{17}H_{24}N_2O_2I_2$: C, 37.6; H, 4.4; N, 5.2. Found: C, 37.6; H, 4.6; N, 5.2.

EXAMPLE 3

*N,N'-tetramethylene-$\Delta^2$-bis-(3-oxypyridyl)betaine dihydrobromide*

To a solution of 9.5 g. of 3-hydroxypyridine in 50 cc. of acetonitrile were added 10.7 g. of 1,4-dibromobutene-2. An immediate reaction occurred, and after 1 hour the product separated and was recrystallized from methanol.

*Analysis.*—Calculated: C, 41.6; H, 4.0; N, 6.9. Found: C, 41.8; H, 4.2; N, 7.4.

EXAMPLE 4

*N,N'-(1,4-dimethyltetramethylene)-bis-(3-oxypyridyl)-betaine dihydrobromide*

A solution of 9.5 g. of 3-hydropyridine and 12.2 g. of 2,5-dibromohexane in 50 cc. of n-propanol was refluxed for 20 hours. On cooling, crystals of the product appeared, which were separated and recrystallized from methanol-ethylacetate.

*Analysis.*—Calculated: C, 44.2; H, 5.1; N, 6.5. Found: C, 44.7; H, 5.5; N, 6.5.

EXAMPLE 5

*N,N'-p,p'-xylylene-bis-(3-oxypyridyl)betaine dihydrobromide*

To a solution of 9.5 g. of 3-hydroxypyridine in 50 cc. of acetonitrile were added 8.75 g. of a,a'-dibromo-p-xylene. The reaction mixture became hot and upon cooling, crystals separated. The reaction mixture was evaporated, and the residue recrystallized from methanol-ethylacetate.

*Analysis.*—Calculated: C, 47.6; H, 4.0; N, 6.2. Found: C, 47.9; H, 3.8; N, 5.8.

The free betaine of the above product was obtained and upon treatment with methyliodide in propanol, as in Example 1, N,N'-p,p'-xylylene-bis-(3-methoxypyridinium) iodide was obtained which was recrystallized from methanol-ethylacetate.

*Analysis.*—Calculated for $C_{20}H_{22}N_2O_2I_2$: C, 41.7; H, 4.9; N, 4.9. Found: C, 41.6; H, 4.3; N, 4.8.

The corresponding N,N'-p,p'-xylylene-bis-(3-ethoxypyridinium) iodide was obtained using ethyl iodide, and recrystallized from methanol-ethylacetate.

*Analysis.*—Calculated for $C_{22}H_{26}N_2O_2I_2$: C, 43.7; H, 4.3; N, 4.6. Found: C, 42.9; H, 4.2; N, 5.1.

EXAMPLE 6

*N,N'-(2-oxa-trimethylene)-bis-(3-oxypyridyl)betaine dihydrochloride*

To a solution of 9.5 g. of 3-hydroxypyridine in 50 cc. of acetonitrile were added 5.8 g. of bis-chloromethylether. An instantaneous exothermic reaction occurred and after cooling a crystalline product was obtained, which was separated by filtration, and recrystallized from methanol.

*Analysis.*—Calculated: C, 47.2; H, 4.6; N, 9.2. Found: C, 47.2; H, 4.9; N, 8.7.

EXAMPLE 7

*N,N'-(2-keto-trimethylene)-bis-(3-oxypyridyl)betaine dihydrochloride*

To a solution of 9.5 g. of 3-hydroxypyridine in 50 cc. of n-propanol were added 6.35 g. of 1,3-dichloro-2-propanone. The reaction mixture was allowed to stand for 3 weeks at ambient temperature, 20° C. to 25° C., and in this interval dark crystals formed. The formed precipitate was separated by filtration and recrystallized from methanol-ethylacetate-ether.

*Analysis.*—Calculated: C, 49.2; H, 4.4; N, 8.8. Found: C, 48.9; H, 4.5; N, 8.9.

Representative compounds of those herein disclosed are set forth in Table I.

TABLE I

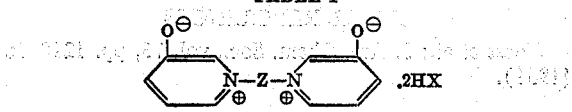

| Z | HX | Formula | M.P., °C. |
|---|---|---|---|
| —CH₂— | HI | C₁₁H₁₃N₂O₂I₂ | 205–8 |
| —(CH₂)₂— | HBr | C₁₂H₁₄N₂O₂Br₂ | 295–6 |
| —(CH₂)₃— | HBr | C₁₃H₁₆N₂O₂Br₂ | 211–3 |
| —(CH₂)₄— | HCl | C₁₄H₁₈N₂O₂Cl₂ | 269–70 |
| —(CH₂)₅— | HBr | C₁₅H₂₀N₂O₂Br₂ | 231–3 |
| —(CH₂)₅— | HCl | C₁₅H₂₀N₂O₂Cl₂ | 217–8 |
| —(CH₂)₆— | HBr | C₁₆H₂₂N₂O₂Br₂ | 274–5 |
| —(CH₂)₈— | HBr | C₁₉H₁₈N₂O₂Br₂ | 227–31 |
| —(CH₂)₁₀— | HBr | C₂₀H₃₀N₂O₂Br₂ | 176–8 |
| —CH₂—CH=CH—CH₂— (H H) | HBr | C₁₄H₁₆N₂O₂Br₂ | 220–2 |
| —CH₂—CH₂—CH₂—CH(CH₃)— | HBr | C₁₅H₂₀N₂O₂Br₂ | 203–6 |
| —CH(CH₃)—CH₂—CH₂—CH(CH₃)— | HBr | C₁₆H₂₂N₂O₂Br₂ | 247–9 |
| —C(=CH₂)—CH₂— | HCl | C₁₃H₁₄N₂O₂Cl₂ | 279 |
| —CH₂—C₆H₄—CH₂— | HBr | C₁₅H₁₈N₂O₂Br₂ | 277–80 |
| —CH₂—O—CH₂— | HCl | C₁₂H₁₄O₃N₂Cl₂ | 211–3 |
| —(CH₂)₂—O—(CH₂)₂— | HCl | C₁₄H₁₈N₂O₃Cl₂ | 169–73 |
| —CH₂C(=O)—CH₂— | HCl | C₁₃H₁₄N₂O₃Cl₂ | 300 |

These newly discovered betaines have useful pharmacological properties such as adrenergic blocking action and anti-inflammatory properties. The compounds also afford readily accessible chemicals for synthetic procedures in which they act as the initial reactants such as those described in our copending application filed of even date herewith Serial No. 608,214, now U.S. Patent No. 2,878,254.

The novel betaines herein described may conveniently be used in the form of water-soluble, nontoxic, acid addition salts or quaternary alkoxylated salts and these salts are within the purview of this invention. The acids which can be used to prepare acid addition salts are those which produce salts whose anions are relatively innocuous in therapeutic doses of the salts so that the beneficial physiological properties inherent in these betaines are not vitiated by side effects ascribable to the anions. Appropriate acid addition salts are those obtained by reaction with mineral acids, e.g., hydrochloric, hydrobromic, hydriodic and sulfuric acids, and organic acids such as p-toluenesulfonic, citric and tartaric acids, and the like. The alkoxyether quaternary ammonium salts are obtained by addition of alkyl or arylalkyl esters of inorganic acids or of organic sulfonic acids including such compounds as methyl iodide, methyl-p-toluenesulfonate, ethyl bromide, methylsulfate, and the like to the free betaine form of the compounds.

It will thus be seen that the objects set forth above, among those made apparent from the preceding description, are efficiently attained and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A compound selected from the group consisting of a free betaine of the formula

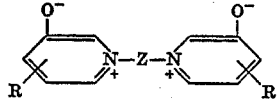

its acid addition salts, said acid addition salts being selected from the group consisting of hydroiodide, hydrobromide, hydrochloride, benzenesulfonate and p-toluenesulfonate, and alkoxylated-bis-pyridinium quaternary salts having the structure

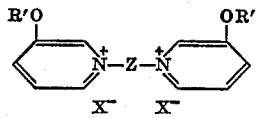

in which Z is a member of the group consisting of —(CH₂)$_n$— wherein $n$ is a whole number from 1–10; p,p'-xylylene, —CH₂OCH₂—, —(CH₂)₂—O—(CH₂)₂—, —CH₂CH=CHCH₂— and —CH₂—CO—CH₂—; R is a member of the group consisting of hydrogen and methyl; R' is lower alkyl, containing not more than three carbon atoms, and X is an anionic component selected from the group consisting of chlorine, bromine, iodine, benzenesulfonate and p-toluenesulfonate.

2. A compound as defined in claim 1 having the formula

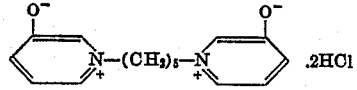

3. A compound as defined in claim 1 having the formula

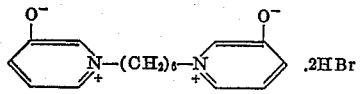

4. A compound as defined in claim 1 having the formula

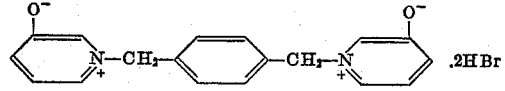

5. A compound as defined in claim 1 having the formula

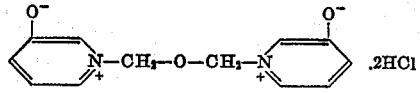

6. A compound as defined in claim 1 having the formula

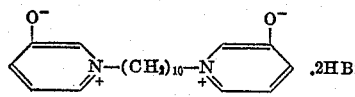

7. A method of preparing betaines having the formula

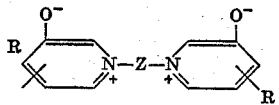

which comprises reacting 2 moles of a 3-hydroxy pyridine and one mole of a compound of the formula X—Z—X wherein Z is a member of the group consisting of —(CH₂)$_n$— wherein $n$ is a whole number from 1–10; p,p'-xylylene, —CH₂OCH₂—, (CH₂)₂—O—(CH₂)₂—, —CH₂CH=CHCH₂— and —CH₂—CO—CH₂—; R is a member of the group consisting of hydrogen and methyl, and X is an anionic component selected from the group consisting of chlorine, bromine, iodine, benzenesulfonate and p-toluenesulfonate, in an organic solvent which will not combine with the reactants, said organic solvent being selected from the group consisting of a lower alcohol, acetonitrile, toluene and xylene, and separating the reaction product.

References Cited in the file of this patent

UNITED STATES PATENTS 2,728,775     Clauson-Kaas _____ Dec. 27, 1955

OTHER REFERENCES

Wuest et al.: J. Am. Chem. Soc., vol. 73, pp. 1210–16 (1951).